D. A. Woodbury,
Steam-Engine Valve-Gear.

Nº 28,521.        Patented Apr. 5, 1859.

Witnesses.
Thomas Pryor
Robert Pearson

Inventor.
D. A. Woodbury

AM. PHOTO-LITHO. CO. N.Y. (OSBORNE'S PROCESS.)

UNITED STATES PATENT OFFICE.

D. A. WOODBURY, OF ROCHESTER, NEW YORK.

VARIABLE CUT-OFF FOR STEAM-ENGINES.

Specification of Letters Patent No. 23,521, dated April 5, 1859.

*To all whom it may concern:*

Be it known that I, D. A. Woodbury, of Rochester, in the county of Monroe and State of New York, have invented a new and Improved Variable Cut-Off Gear for Steam-Engines; and I do hereby declare that the following is a full, clear, and exact description of the same, reference being had to the accompanying drawing, forming part of this specification, in which—

Figure 1:
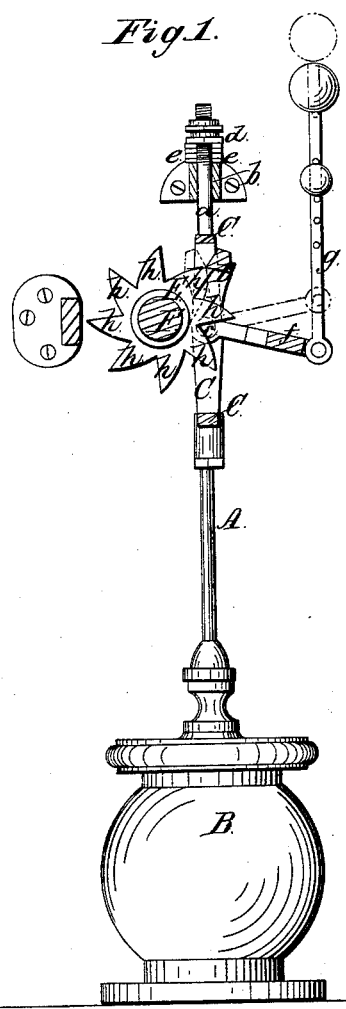
Figure 2:
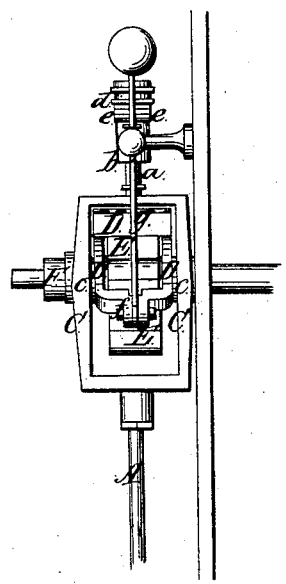

Figure 1, is a side view, partly in section, of my improved cut-off gear. Fig. 2, is a front view of the same.

Similar letters of reference indicate corresponding parts in both figures.

This invention consists in a certain novel and simple combination of a vibrating yoke attached to the stem of a cut-off valve and a rotary cam or wiper wheel deriving a positive rotary motion from the engine, which provides for the opening of the cut-off valve always at the proper time, and the closing of the same to cut off the steam at any point in the stroke of the engine that may be desired.

To enable others skilled in the art to make and use my invention, I will proceed to describe its construction and operation.

A, is the stem of the cut off valve which is contained within a box B, which may be bolted on to the steam chest of an engine or be arranged in the steam pipe, said valve being of the puppet, hollow cylinder, piston, or any other kind that is commonly used for or applicable to the purpose. This stem has attached rigidly a quadrangular yoke C, and above this yoke is a guide rod $a$, working in a stationary guide $b$, on which when the valve is not of the puppet kind I propose to arrange a nut or adjustable collar $d$, padded underneath with washers $e$, $e$, of leather or other soft material to operate as a stop in combination with the guide $b$, to arrest the valve in its fall, when closed.

D is the vibrating yoke which constitutes part of my invention, arranged within the rigid yoke C, of the valve stem and attached to the sides thereof by two journals or pivots $c$, $c$, on which it is capable of swinging freely. This yoke D, has an arm $f$, to which is attached a rod $g$, which may be connected with a governor or be furnished with a handle and means of securing it in various positions.

E, is the rotary cam or wiper wheel by which the cut off valve is opened to admit steam to the engine at the proper time, said cam being secured to a shaft F, which is fitted to suitable fixed bearings and which derives a positive and constant rotary motion from the engine by being geared with its main shaft or by other means, said shaft having its axis arranged parallel with the axis of the journals or pivots $c$, $c$, of the yoke D, and said cam or wiper wheel having the tappets or wipers $h$, $h$, working within the yoke D, in such a manner that by their revolution, each shall, by its operation on the upper part of the said yoke, raise the valve, the number of said tappets or wipers and the velocity of the revolution being such that the valve shall be lifted at the commencement of every stroke of the engine.

The inner or lower face of the top of the yoke D, is in the form of an arc of a circle described from the axis of the pivots or journals $c$, $c$, and the operating faces of the tappets or wipers $h$, $h$, are so formed in arcs of corresponding circles, that, at the time of coming in contact with the top of the yoke to commence the lift of the valve, they are concentric to the axis of the pivots or journals $c$, $c$, as shown in Fig. 1 where one of said tappets or wipers is represented as about to commence the lift of the valve, and hence whatever the position of the yoke, within the proper limits for operating the valve, the opening of the valve at the proper time is insured.

The tappets or wipers in their operation on the yoke continue to lift the valve till they, in their revolution, work clear of the top of the yoke, when they set the valve free and allow it to close by gravitation alone, or by the aid of springs or by the pressure of steam, or by any or all of these agencies combined. The time the valve is allowed to remain open depends entirely on the position of the yoke, as will be understood by reference to Fig. 1, where the yoke is shown in two positions. In the position shown in black the tappet or wiper would escape and allow the valve to close after a very small lift and thus cut off the steam early in the stroke of the engine; but in the position shown in red, the tappet or wiper it is obvious would remain in operation on the yoke much longer and thus not cut off the steam so early in the stroke. The position may be varied to cut off the steam at any point in the stroke, and this may be adjusted permanently to cut off at any fixed point desired or may be regulated by the governor attached to the rod $g$.

What I claim as my invention and desire to secure by Letters Patent, is—

The combination of the vibrating yoke D, attached to the valve stem and the rotary cam or wiper wheel E, having arc-formed tappets or wipers $h$, $h$, the whole being applied and operating substantially as herein set forth.

D. A. WOODBURY.

Witnesses:
 THOMAS PRYON,
 ROBERT PEARSON.